United States Patent [19]

Inoue

[11] Patent Number: 5,371,134
[45] Date of Patent: Dec. 6, 1994

[54] ELECTRICALLY CONDUCTIVE RESIN COMPOSITIONS

[75] Inventor: Kazushige Inoue, Moka, Japan

[73] Assignee: GE Plastics Japan, Ltd., Tokyo, Japan

[21] Appl. No.: 96,528

[22] Filed: Jul. 22, 1993

[30] Foreign Application Priority Data

Jul. 30, 1992 [JP] Japan ................. 4-223188

[51] Int. Cl.⁵ ................. C08K 3/04; C08K 3/40
[52] U.S. Cl. ................. 524/495; 524/404; 524/439; 524/452; 524/494; 524/496; 524/492; 523/137; 252/502; 252/511
[58] Field of Search ......... 524/495, 404, 452, 494, 524/496, 439; 523/137; 252/502, 511

[56] References Cited

U.S. PATENT DOCUMENTS

| | | | |
|---|---|---|---|
| 3,838,097 | 9/1974 | Wirth et al. | 528/170 |
| 4,049,613 | 9/1977 | White | 524/495 |
| 4,985,175 | 1/1991 | Dziurla et al. | 252/511 |
| 5,191,020 | 3/1993 | Masamoto et al. | 525/537 |

FOREIGN PATENT DOCUMENTS

| | | |
|---|---|---|
| 0351660 | 1/1990 | European Pat. Off. . |
| 0355615 | 2/1990 | European Pat. Off. . |
| 1261354 | 11/1986 | Japan . |
| 3091556 | 4/1991 | Japan . |

OTHER PUBLICATIONS

Database WPI Section Ch, Week 15, Derwent Publications Ltd., London, GB; Class A31, AN 88-101579 & JP-A-63 051 109 (Toshiba) 4 Mar. 1988.

*Primary Examiner*—Paul R. Michl
*Assistant Examiner*—Tae H. Yoon

[57] ABSTRACT

Electrically conductive resin compositions are provided. The electrically conductive resin composition comprises
(A) the following in a total of 100 parts by weight:
  (a) 50–99 parts by weight of polyether imide resin, and
  (b) 1–50 parts by weight of polyphenylene sulfide resin; and
(B) 1–30 parts by weight of electrically conductive carbon black.

This resin composition exhibits excellent electrical conductivity, flame retardance, heat resistance, mechanical properties and moldability.

18 Claims, No Drawings

ELECTRICALLY CONDUCTIVE RESIN COMPOSITIONS

BACKGROUND OF THE INVENTION

1. Field of the Invention

This invention relates to electrically conductive resin compositions.

2. Description of the Related Art

The addition of electrically conductive carbon black to thermoplastic resins has hitherto been widely carried out in order to confer antistatic properties and electrical conductivity.

However, in order to obtain the desired electrical properties by the addition of electrically conductive carbon black, a large amount of carbon black is needed. When a large amount of carbon black is added, the moldability, flame resistance, and mechanical properties of the resulting resin composition decrease.

Hence, the object of this invention is to obtain resin compositions having an excellent electrical conductivity, as well as good moldability, good flame retardance and good mechanical properties.

SUMMARY OF THE INVENTION

The inventors discovered that when a small amount of carbon black is added, formulations of polyether imide resins (PEI) and polyphenylene sulfide resins (PPS) exhibit electrical conductivity, thereby giving resin compositions having excellent fluidity and heat resistance without a decrease in flame resistance on account of carbon black addition.

Hence, this invention is an electrically conductive resin composition comprising
(A) the following in a total of 100 parts by weight:
  (a) 50–99 parts by weight of polyether imide resin, and
  (b) 1–50 parts by weight of polyphenylene sulfide resin; and
(B) 1–30 parts by weight of electrically conductive carbon black.

DETAILED DESCRIPTION OF THE INVENTION

In this invention, astonishing as it may seem, by combining PPS in PEI, the electrical conductivity can be greatly enhanced with a relatively small amount of electrically conductive carbon black. The present invention is not restricted by any particular theory, but the reason why it has an advantageous effect is thought to be due to the presence of more carbon black in the non-crystalline PEI matrix layer than in the crystalline PPS dispersion layer. That is, in the compositions according to this invention, carbon black is not dispersed throughout the entire composition: instead, because it is dispersed primarily in the matrix, excellent electrical conductivity is thought to be imparted by a smaller amount of carbon black. In Example 2 described later in this specification, 30 parts by weight of PPS is added; hence, the concentration of conductive carbon black in the PEI to 7.1 wt %. Although the concentration in Comparative Example 2 is also 7.1 wt %, the surface resistances are respectively 106 and 1012, which represents a considerable difference. This cannot be explained solely in terms of the weight ratio of carbon black, which makes the results of this invention unexpected. Because the amount of carbon black in the compositions according to this invention are small, there does not appear to be a loss in the excellent flame retardances intrinsic to PEI and PPS. Moreover, the excellent heat resistance and high fluidity of PPS, the mechanical properties of PEI, and the imparting of a suitable degree of fluidity due to the formulation thereof appear to be combined in the resin compositions of this invention.

The polyether imide serving as Component (a) is known in and of itself and generally contains repeating units having the following formula

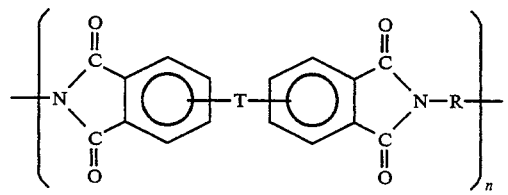

where T is —O— or —O—Z—O—, and the two bonding partners bond at the 3,3', 3,4', 4,3', or 4,4' positions; Z is a divalent organic group selected from the group consisting of (I)

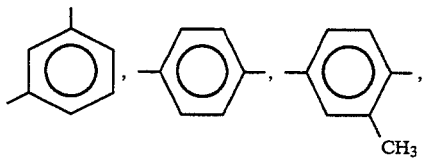

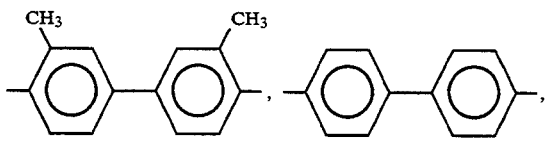

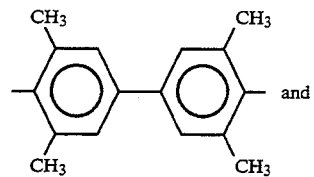

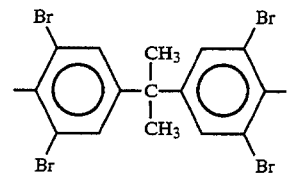

and (II)

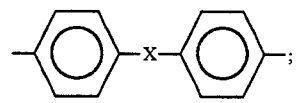

in formula (II), X is a divalent group selected from the group consisting of —$C_yH_{2y}$—, —C(=O)—, —S(=O)$_2$—, —O— and —S—, where y is an integer from 1 to about 5; R is a divalent organic group selected from the group consisting of (i) aromatic hydrocarbon groups having 6 to about 20 carbons and their halogenated derivatives, (ii) alkylene groups having 2 to about 20 carbons and cycloalkylene groups having 2 to about 20 carbons, and
(iii) groups having the formula

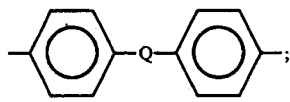

(in the formula in (iii), Q is a divalent group selected from the group consisting of —S—, —O—, —C(=O)—, —S(=O)$_2$— and —C$_x$H$_{2x}$—, where x is an integer from 1 to about 5, and n is the number of repeating units).

Preferable polyether imides include the following polyimide repeating units

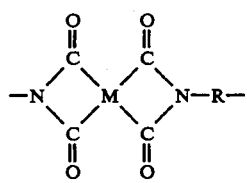

(where R is the same as above; M is a group selected from among

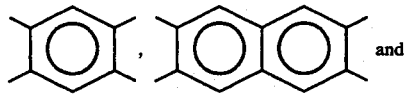

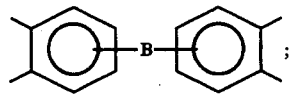

and B is —— or —C(=O)—).

Especially preferable polyether imide resins that can be cited include those represented by the following formula

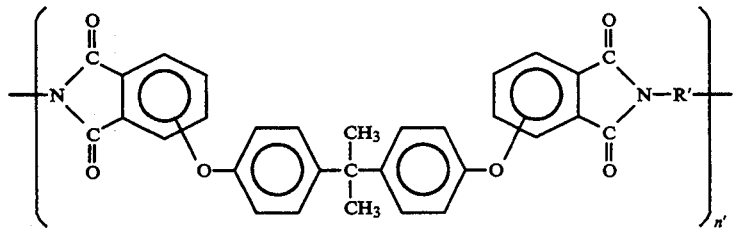

(where R' is an aromatic hydrocarbon group having 6–20 carbons, and n' is an integer equal to or greater than 2). A typical example is Ultem ™ (General Electric Co.), the production method for which has been disclosed in Japanese Published Examined Patent Application (Kokoku) No. 57-9372 (1982). These polyether imide resins must have a degree of polymerization sufficient to confer impact resistance.

The PPS serving as Component (b) used in this invention should preferably include at least 70 mol % of constituent units having the formula

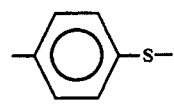

because this provides compositions having excellent properties. Examples that may be cited of the PPS polymerization method include a method whereby p-dichlorobenzene is polymerized in the presence of sulfur and sodium carbonate, a method whereby polymerization is carded out in a polar solvent and in the presence of sodium sulfate, sodium hydrosulfide and sodium hydroxide, or hydrogen sulfide and sodium hydroxide; and the self-condensation of p-chlorothiophenol. However, it is appropriate to use a method whereby sodium sulfide and p-dichlorobenzene are reacted in an amide-type solvent such as N-methylpyrrolidone or dimethyl acetamide, or in a sulfone-type solvent such as sulfolane. Preferable methods for adjusting the degree of polymerization at this time consist of adding the alkali metal salts of carboxylic acid and sulfonic acid, or of adding an alkali hydroxide. When the copolymer component is less than 30 mol %, this may include meta bonds, ortho bonds, ether bonds, sulfone bonds, biphenyl bonds, substituted phenylsulfide bonds or trifunctional phenyl sulfide bonds such as the following

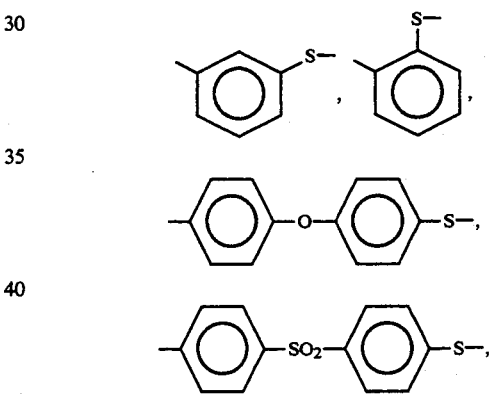

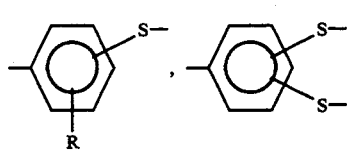

(where R is an alkyl, nitro, phenyl, alkoxy or carboxylic acid group, or the metal salt of a carboxylic acid), provided this is within a range that does not have a large influence on the crystallinity of the polymer; the copolymer components should preferably be 10 mol % or less. In particular, when phenyl, biphenyl, naphthylsulfide bonds or the like that are at least trifunctional are selected in the copolymer, the amount of these components should be no more than 3 mol %, and preferably no more than 1 mol %.

This PPS is synthesized by a conventional production process, examples of which include:
(1) the reaction of a halogen-substituted aromatic compound and an alkali sulfide (see U.S. Pat. No. 2,513,188, and Kokoku Nos. 44-27,671 (1969) and 45-3368 (1970)),
(2) a condensation reaction on thiophenols in the presence of an alkali catalyst, a copper salt, or the like (see U.S. Pat. No. 3,274,165, and British Patent No. 1,160,660), or
(3) the condensation of an aromatic compound with sulfur chloride in the presence of a Lewis acid catalyst (see Kokoku No. 46-27,255 (1971) and Belgium Patent No. 29,437).

The process may be selected as desired in accordance with the aim.

PPS is currently supplied to the market by Phillips Petroleum, "Toso Sasteel" KK, "Topren" KK, and Kureha Chemical Industry. There are various grades according to the crosslinking density and viscosity; these can be used as appropriate in the present invention.

In the compositions of this invention, the above-described PPS is included in an amount of 1-50 pans by weight per 50-99 parts by weight of PEI. When the amount of PPS is less than I part by weight, the electrical conductivity and fluidity of the resin compositions is inadequate; when this exceeds 50 parts by weight, the fluidity of the resin compositions increases, but the mechanical properties are compromised. It is preferable that the amount of PPS be 3-45 pans by weight with respect to 55-97 pans by weight of PEI, and especially 5-40 pans by weight with respect to 60-95 parts by weight of PEI.

When added to the resin, the electrically conductive carbon black serving as component (B) imparts a high electrical resistance and greatly lowers the surface resistance of the resin. In this invention, it is preferable to make use of acetylene black, furnace black, or the like. Specific examples of commercial furnace blacks include Ketjenblack EC (trademark of "Akzo," of the Netherlands) and Vulcan XC72 (trademark of Cabot Corp.).

Component (B) is included in an amount of 1-30 pans by weight per 100 parts by weight of component (A). When the amount of component (B) is less than 1 pan by weight, the electrical conductivity of the resin composition thus obtained is inadequate. When the amount is more than 30 pans by weight, the fluidity and mechanical properties of the composition decline. The amount of component (B) included should preferably be 2-25 parts by weight, and in particular 3-20 parts by weight, per 100 parts by weight of component (A).

Rubbery substances may be included in an amount of 80 pans by weight or less, for example, per 100 parts by weight of component (A) as an optional ingredient for further enhancing the impact strength. Rubbery substances include natural and synthetic polymer materials that are elastic bodies at room temperature. Specific examples that may be cited include natural rubbers, butadiene polymers, styrene-isoprene copolymers, butadiene-styrene copolymers (random copolymers, block copolymers, graff copolymers and the like are all included), isoprene polymers, chlorobutadiene polymers, butadiene-acrylonitrile copolymers, isobutylene polymers, isobutylene-butadiene copolymers, isobutylene-isoprene copolymers, acrylate polymers, ethylene-propylene copolymers, ethylene-propylene-diene copolymers, Thiokol rubbers. polysulfide rubbers, polyurethane rubbers, polyether rubbers (e.g., polypropylene oxide) and epichlorohydrin rubbers. These rubbery substances may be prepared by any polymerization process (e.g., emulsion polymerization, solution polymerization) in the presence of any catalyst (e.g., peroxides, trialkyl aluminum, halogenated lithium, nickel catalysts). In addition, rubbery substances having various degrees of crosslinking, various microstructure ratios (e.g., cis structures, trans structures, vinyl groups), or having various average rubber particle sizes may be used. Various kinds of copolymers, such as random copolymers, block copolymers or graft copolymers, may be used as the rubbery substances of this invention. In addition, when producing these rubbery substances, copolymerization with monomers such as other olefins, dienes, aromatic vinyl compounds, acrylic acid, acrylates and methacrylates is also possible. Any means such as random copolymerization, block copolymerization or graft copolymerization may be used for such copolymerization. Specific examples of these monomers that may be cited include ethylene, propylene, styrene, chlorostyrene, α-methylstyrene, butadiene, isobutylene, chlorobutadiene, butene, isobutylene, methyl acrylate, acrylic acid, ethyl acrylate, butyl acrylate, methyl methacrylate and acrylonitrile. In addition, partially modified rubbery substances may be used. Examples that may be cited include hydroxy- or carboxy-terminal modified polybutadienes, partially hydrogenated styrene-butadiene block copolymers, and partially hydrogenated styrene-isoprene block copolymers.

One or more conventional additives, including antioxidants, heat stabilizers, ultraviolet light absorbers, lubricants, mold release agents, colorants such as dyes and pigments, flame retardants, flame-retarding assistants and antistatic agents may be added to the compositions obtained according to this invention provided this is done within a range that does not compromise the object of the invention. Reinforcing agents such as glass fibers, carbon fibers, boron fibers, silicon carbide fibers, asbestos fibers and metal fibers; fillers such as clay, mica, silica, graphite, glass beads, alumina and calcium carbonate; and small amounts of other thermoplastic resins may also be added.

A melt-kneading process is desirable as the method for preparing the compositions according to this invention. Although the use of a small amount of solvent is possible, it is generally not necessary. Examples of devices that can be cited in particular include extruders, Banbury mixers, rollers and kneader; these can be operated in a batch-wise or continuous manner. There is no particular restriction on the ingredient mixing sequence. In this specification, two of the three essential ingredients (PEI and PPS) according to the invention are indicated collectively as component (A) and thereby distinguished from carbon black; the purpose of this is to clearly indicate the weight ratios of the various ingredients, but this in no way restricts the mixing sequence.

The resin compositions according to this invention can be prepared by a variety of methods, such as a method whereby the PPE, PPS, carbon black and optional ingredients such as rubbery substances are mixed at the same time; a method whereby the PEI and optional ingredients such as the rubbery substances are pre-mixed, after which this initial mixture is mixed with the PPS and the carbon black; a method whereby the PEI and PPS are mixed, after which this initial mixture is mixed with the carbon black and the optional ingredients; and a method whereby the PEI and part of the carbon black and the optional ingredients are pre-mixed, the PPS and the remainder of the carbon black and the optional ingredients are likewise pre-mixed, then these two mixtures are mixed together. Here, by pre-mixing the PEI and the carbon black, then mixing this initial mixture with the PPS, the portion of the carbon black used that is present within the PEI matrix phase can be increased.

The electrically conductive resin compositions of this invention not only have electrical conductivity, they also have excellent flame retardance, heat resistance, mechanical properties, and moldability. In addition, they exhibit a good resistance to chemicals, weather resistance, and dimensional stability. For this reason, they are particularly useful in articles such as electrically conductive sheets, electromagnetic interference shield materials, connectors, printed circuits, IC sockets and semiconductor fabrication jigs.

The present invention shall now be described more concretely by means of examples, although it shall be understood that this invention is in no way restricted by these examples.

EXAMPLES

In the examples of the invention and the comparative examples presented below, Ultem 1010 (a polyether imide; General Electric Co.) was used as the PEI, T-4 (a polyphenylene sulfide; "Topren") was used as the PPS, Ketjenblack EC ("Akzo") was used as the electrically conductive carbon black (CB), and FT-591 (Asahi Fiberglass; chopped glass with a diameter of 10 um) was used as the glass fiber serving as an optional ingredient.

The various ingredients in the amounts indicated in Table 1 (pans by weight) were kneaded using a twin-screw extruder (screw rate of rotation, 150 rpm) set at 360° C., and pellets thereby fabricated.

Various types of test pieces were formed by injection molding at 360° C. from the pellets thus obtained, and evaluated for the following properties.

Surface Resistance (units: $\Omega/cm^2$): Measured in general accordance with ASTM D-257.

Heat Distortion Temperature (°C.): Measured in general accordance with ASTM D-648 under a load of 18.6 kg/cm².

Melt Flow Index (MFI, g/10 min): Measured in general accordance with ASTM D-1238; temperature, 343.3° C.; 6.7 kg.

Flame Retardance: Evaluated based on UL94. Thickness, 0.8 mm.

Flexural Strength (units, kg/cm²): Measured in general accordance with ASTM D-790.

Flexural Modulus (units, kg/cm²): Measured in general accordance with ASTM D-790.

These results are shown in Table 1.

TABLE I

| | Examples of invention | | | Comparative examples | | |
|---|---|---|---|---|---|---|
| | 1 | 2 | 3 | 1 | 2 | 3 |
| Composition | | | | | | |
| PEI | 66 | 56 | 64 | 86 | 84 | 70 |
| PPS | 20 | 30 | 20 | — | — | 20 |
| CB | 4 | 4 | 6 | 4 | 6 | — |
| GF | 10 | 10 | 10 | 10 | 10 | 10 |
| Properties of moldings | | | | | | |
| Surface resistance | $10^{12}$ | $10^6$ | $10^6$ | $>10^{14}$ | $10^{12}$ | $>10^{14}$ |
| Heat distortion temperature | 207 | 206 | 208 | 210 | 210 | 211 |
| MFI | 20 | 18 | 16 | 13 | 10 | 22 |
| Flame resistance | V-0 | V-0 | V-0 | V-0 | V-1 | V-0 |
| Flexural strength | 1,600 | 1,600 | 1,600 | 1,600 | 1,600 | 1,700 |
| Flexural modulus | 48,000 | 48,000 | 49,000 | 48,000 | 48,000 | 47,000 |

From Table 1, it is apparent that the resin compositions according to the present invention have excellent electrical conductivity and flame retardance, as well as good heat resistance, fluidity and mechanical properties.

What is claimed is:

1. An electrically conductive resin composition comprising
   (A) the following in a total of 100 parts by weight:
      (a) 50–99 parts by weight of polyether imide resin, and
      (b) 1–50 parts by weight of polyphenylene sulfide resin; and
   (B) 1–30 parts by weight of electrically conductive carbon black.

2. The composition of claim 1, wherein said 100 parts by weight of (a) consists of 55 to 97 parts by weight of polyetherimide resin, and 3 to 45 parts by weight of polyphenylene sulfide resin.

3. The composition of claim 1, wherein said 100 parts by weight of (a) consist of 60 to 95 parts by weight of polyetherimide resin, and 5 to 40 parts by weight of polyphenylene sulfide resin.

4. The composition of claim 1, wherein said composition consists essentially of said polyetherimide resin, said polyphenylene sulfide resin, and said carbon black.

5. The composition of claim 1, wherein said composition consists of said polyetherimide resin, said polyphenylene sulfide resin, and said carbon black.

6. The composition of claim 1, wherein said polyetherimide resin contains repeating units having the following formula

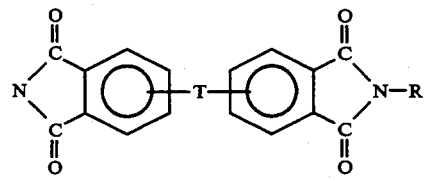

where T is selected from the group consisting of —O— and —O—Z—O—, wherein Z is a divalent organic group selected from the group consisting of

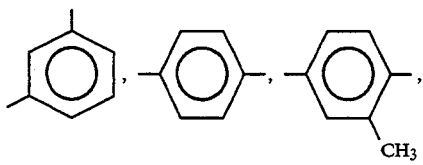

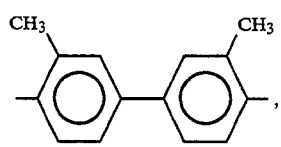

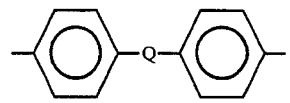

where Q is a divalent group selected from the group consisting of —S—, —O—, —C(=O)—, —S(=O)$_2$— and —C$_x$H$_{2x}$—, where x is an integer from 1 to about 5.

7. The compositions of claim 1 wherein said polyetherimide is represented by the following formula:

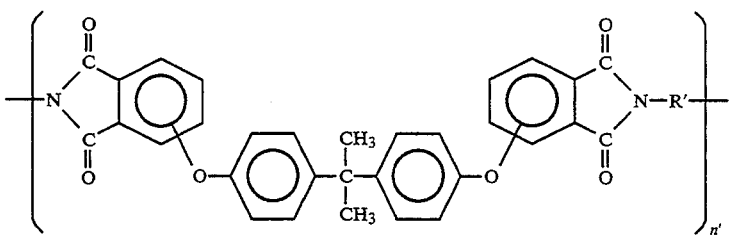

where R' is an aromatic hydrocarbon group having 6–20 carbons, and n' is an integer equal to or greater than 2.

8. The composition of claim 1 wherein said polyphenylene sulfide resin includes at least 70 mol percent of constituent units having the formula

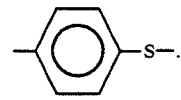

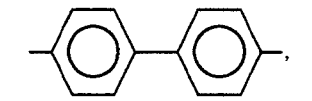

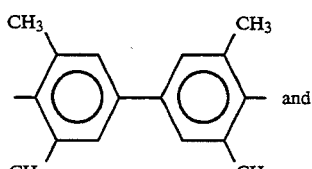

and

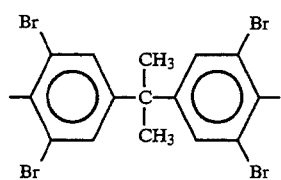

and

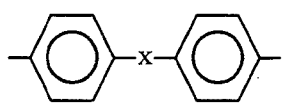

wherein X is a divalent group selected from the group consisting of —C$_y$H$_{2y}$—, —C(=O)—, —S(=O)$_2$—, —O— and —S—, where y is an integer from 1 to 5; —R— is a divalent organic group selected from the group consisting of (i) aromatic hydrocarbon groups having 6 to 20 carbons and their halogenated derivatives,
(ii) alkylene groups having 2 to 20 carbons and cycloalkylene groups having 2 to 20 carbons, and
(iii) groups having the formula 9. A composition as in claim 1, comprising 2 to 25 parts by weight of said carbon black based on the total weight of the composition.

10. A composition as in claim 1, comprising 3 to 20 parts by weight of said carbon black based on the total weight of the composition.

11. The composition of claim 1 further comprising 8 parts by weight or less of a rubbery substance to enhance the impact strength of said composition.

12. The composition of claim 1, further comprising a reinforcing agent selected from the group consisting of glass fibers, carbon fibers, boron fibers, silicon carbide fibers, asbestos fibers, and metal fibers.

13. The composition of claim 12, wherein said composition comprises glass fibers.

14. The composition of claim 13, wherein said glass fibers are present at 10 parts by weight.

15. The composition of claim 1, wherein said carbon black is present at 4 parts by weight.

16. The composition of claim 1, wherein said composition has a surface resistance of 10$^6$ ohms per CM$^2$ as measured by ASTM D-257.

17. A method for making the composition of claim 1, comprising melt-kneading said polyetherimide resin, said polyphenylene sulfide resin and said carbon black.

18. An article made from the composition of claim 1, said article being selected from the group consisting of electrically conducted sheets, electromagnetic interference shield materials, connectors, printed circuits, sockets and semiconductor fabrication jigs.

* * * * *